United States Patent [19]

Fennelly

[11] Patent Number: 4,739,725
[45] Date of Patent: Apr. 26, 1988

[54] SELF CONTAINED DISPOSABLE SYSTEM FOR ANIMAL LITTER BOX MAINTENANCE

[76] Inventor: James B. Fennelly, 873 Manorcrest, Kansas City, Kans. 66101

[21] Appl. No.: 859,305

[22] Filed: May 5, 1986

[51] Int. Cl.$^4$ .............................................. A01K 29/00
[52] U.S. Cl. ....................................................... 119/1
[58] Field of Search ............................................. 119/1

[56] References Cited

U.S. PATENT DOCUMENTS

| | | |
|---|---|---|
| 3,085,550 | 4/1963 | Crawford . |
| 3,141,441 | 7/1964 | Russell . |
| 3,246,030 | 4/1966 | Dearing et al. ............ 119/1 |
| 3,310,031 | 3/1967 | Lowe, Jr. . |
| 3,377,990 | 4/1968 | Mitchell . |
| 3,735,735 | 5/1973 | Noroian .................. 119/1 |
| 3,743,169 | 7/1973 | Person .................. 229/31 R |
| 3,743,170 | 7/1973 | Riccio .................... 229/33 |
| 3,745,975 | 7/1973 | Prucha ................... 119/1 |
| 3,752,121 | 8/1973 | Brazzell ................. 119/1 |
| 3,809,013 | 5/1974 | Rigney et al. ........... 119/1 |
| 3,831,557 | 8/1974 | Elesh ..................... 119/1 |
| 4,029,048 | 6/1977 | Gershbein .............. 119/1 |
| 4,164,314 | 8/1979 | Edgar .................... 119/1 |
| 4,171,680 | 10/1979 | Silver et al. ............ 119/1 |
| 4,271,787 | 6/1981 | Wellman et al. ........ 119/1 |
| 4,279,217 | 7/1981 | Behringer .............. 119/1 |
| 4,348,982 | 9/1982 | Selby ..................... 119/1 |
| 4,646,685 | 3/1987 | Arenz .................... 119/1 |

Primary Examiner—John E. Murtagh
Assistant Examiner—Caroline D. Dennison
Attorney, Agent, or Firm—Litman, McMahon & Brown

[57] ABSTRACT

A self contained disposable system for animal litter box maintenance includes a rectangular container with flaps which are erected and interconnected with tape to form a high sided litter box. A plurality of layers of absorbent litter are positioned within the box and separated by plastic sheets having borders which are adhered to the sides of the box by releasable adhesive. Each layer separation sheet includes an integral pouch which is folded under the sheet. When the litter in a layer has been used, it is removed by peeling the borders of the sheet from the sides of the box and allowing the litter to slide into the pouch for containment and disposal. Such removal of a layer of litter and its sheet exposes the next layer of litter for use by a pet.

10 Claims, 3 Drawing Sheets

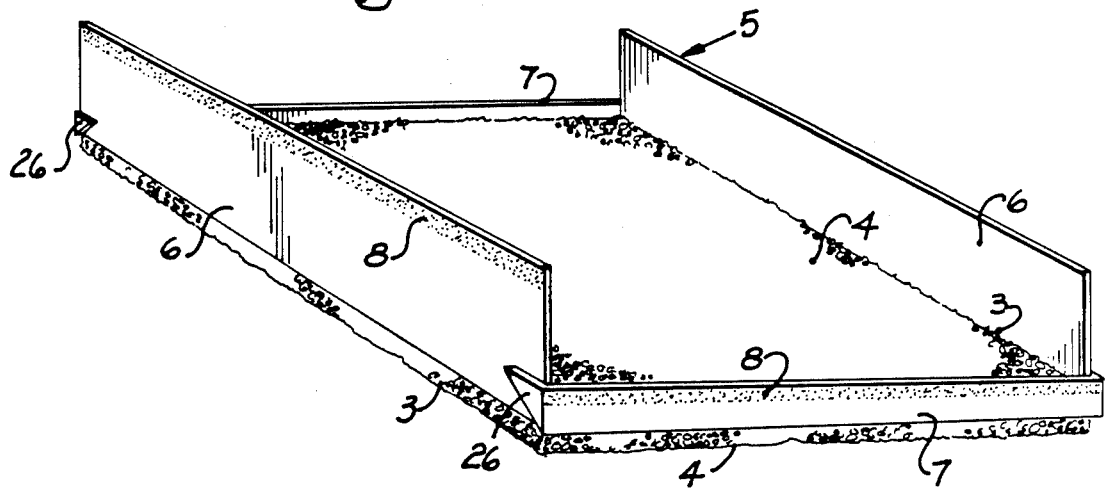
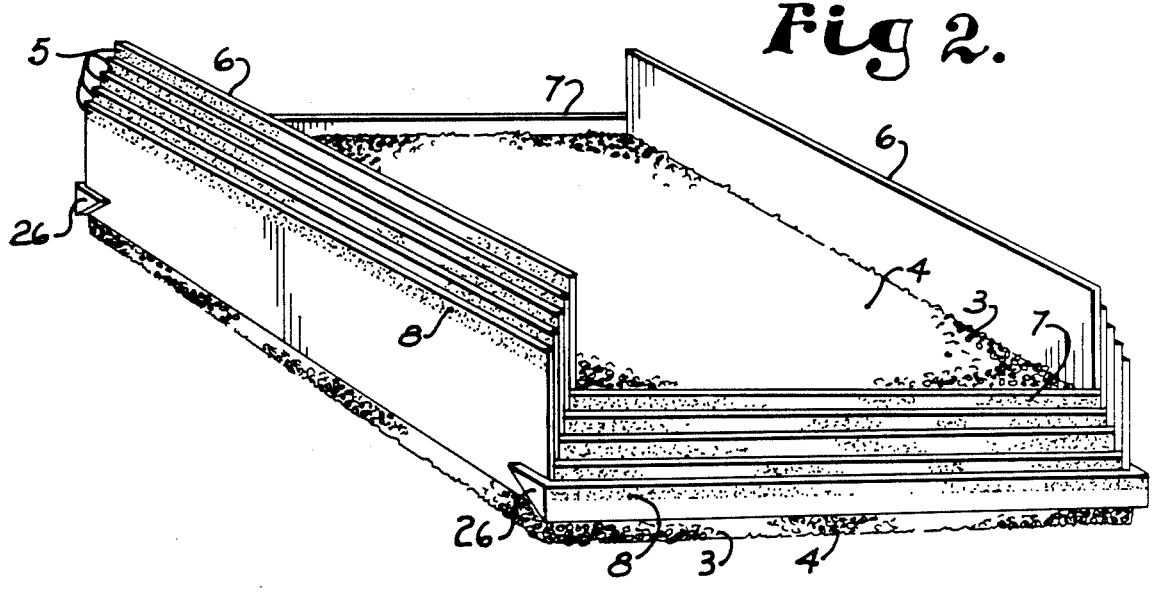

SELF CONTAINED DISPOSABLE SYSTEM FOR ANIMAL LITTER BOX MAINTENANCE

BACKGROUND OF THE INVENTION

Many people enjoy the companionship of small animals which they allow to share their homes or apartments. These animals are confined to the home environment during most of the day and night because of the inherent dangers facing a small creature in the world just outside its door. This inhome confinement makes it necessary that there be provisions for a facility in which the animal can relieve itself of body waste in a manner agreeable to both the human and the pet. The most widely accepted solution for this necessity is the use of a box or pan containing a small amount of absorbent material in which the anumal can dig around and bury its waste. This system provides the most natural environment in the home for the animal to satisfy its instinct to bury its waste, which encourages the animal to seek out this facility each time it has the need to relieve itself.

Unfortunately, this solution while being adequate for the animal's needs, becomes a disagreeable and time consuming chore for the human because of all the steps required to refresh the cat box using the products available on the market today. It involves dumping the soiled absorbent into a receptacle, cleaning the cat box, and then refilling it from a bulky bag each time the box needs changing. Add to this the use of newspaper to line the box or expensive liners, and the task can take from five to ten minutes to complete.

There are a few inventions which address this situation. Reference is made to U.S. Pat. Nos. 3,743,170; 3,745,975; 4,171,680; and 4,271,787. While these inventions offer alternative processes to the present invention, they seem to complicate the chore, offer no time savings, or their cost would overshadow any benefit they offer.

OBJECTS OF THE INVENTION

Therefore, it is the object of this invention to provide an affordable system for the fast and convenient maintenance of an animal relief station which offers the small animal a place to satisfy its instinct to bury its waste. A further object of this invention is that it be simple to operate. This system takes about two minutes to set up, and each of a number of litter box refreshings takes about ten seconds. Since the system is completely disposable, there is no need for washing the container.

SUMMARY OF THE INVENTION

This invention is a self contained and disposable system for the maintenance of a litter box. The system is installed, transported, and used inside a container which is rectangular to square in shape. The container is an ordinary cardboard box with flaps extending from each of the four sides and folded in towards the center of the box at a ninety degree angle to form the top and bottom. When the flaps forming the top of the container are unfolded, a layer of absorbent material is exposed for use as a toilet by a small pet. The flaps are secured together in an upright manner by use of adhesive strips forming a rigid enclosure with sides of sufficient height to prevent the animal from dispersing material outside the box during its toilet activities inside the box. On one of the flaps, there is provided a perforated line which provides for the removal of a U-shaped portion of the flap to allow for easy entry and exit by the animal.

Inside the container, a plurality of layers of absorbent material are installed in a stacked configuration and separated by sheets of plastic film. As one layer of absorbent is being used by the animal as a toilet, the layers below are protected by the plastic film. The film covers the layer of absorbent below it and extends up the inside walls of the container on four sides. On two ends of the container, wide borders of the film extend about four inches up the inside wall and is bonded to the container along a line at the very top of this extension. On the two sides of the sheet, narrow borders of the film extend up about an inch and are bonded in the same manner. The purpose for the two wide borders is to provide clean surfaces with which to handle the sheet and soiled absorbent when they are being removed from the container together. The short extensions or narrow borders hold the sheet down against the absorbent layer which the plastic film rests on. The adhesive bond on the short extensions is the bond against which the animal will pull when scratching and digging. Only a small amount of force is exerted against the long extension while the animal is scratching and digging in the absorbent.

The plastic sheet is folded, cut, and sealed to form a pouch. The pouch is used to contain the soiled absorbent when the plastic film is removed from the box. The pouch is rectangular in shape and is folded flat underneath the sheet to which it is attached. The opening of the pouch is a slit which runs the length of the box and is placed along a line formed by the side of the box and the absorbent layer of the sheet covers. This opening is at the base of one of the two long extensions. The pouch is cut so that it fits snugly inside the perimeter of the box but remains free of the adhesive bond holding the plastic sheet in place. There is a small amount of plastic added to the sheet that functions to guard the opening of the pouch from the animal. The guard is a strip of plastic film the same thickness as the plastic sheet and about as long as the opening of the pouch. The strip is about one inch wide, is attached to the extension just above the pouch opening, and extends down to cover the opening. The guard protects against the animal getting a good hold on the pouch opening and damaging the plastic sheet, the pouch, or the adhesive bond holding the sheet in place.

To remove a layer of soiled absorbent, the user simply loosens the long extension opposite the pouch opening and pulls the sheet towards the pouch opening. As the sheet is pulled, the adhesive bond releases, and the absorbent falls towards the pouch opening. When the end of the adhesive bond is reached, the pouch opens from the force of the pulling, and the entire layer falls into the pouch. Then the plastic sheet may be pulled free from the remaining bond, removed from the container, and deposited in a receptacle. Removal of one layer of absorbent makes the next layer available for use. This procedure is repeated until the last layer becomes soiled, at which time the box may be disposed of with the soiled absorbent and another system started.

BRIEF DESCRIPTION OF THE DRAWING FIGURES

FIG. 2 is a perspective view of layers of absorbent litter of the system separated by sheets, and shown with the container removed.

FIG. 3 is a perspective view similar to FIG. 2 and illustrates a single layer of the animal litter box system.

DETAILED DESCRIPTION OF THE INVENTION

Figure 1:
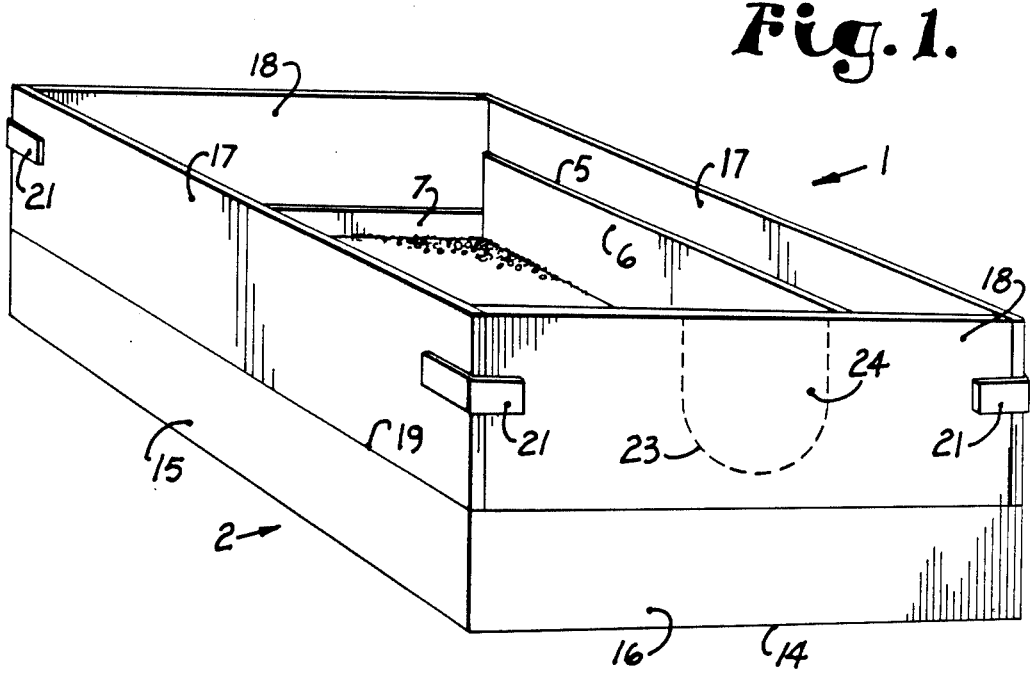
FIG. 1 is a perspective view of a container of the animal litter box system according to the present invention with flaps of the container open and set up for use.
Figure 5:
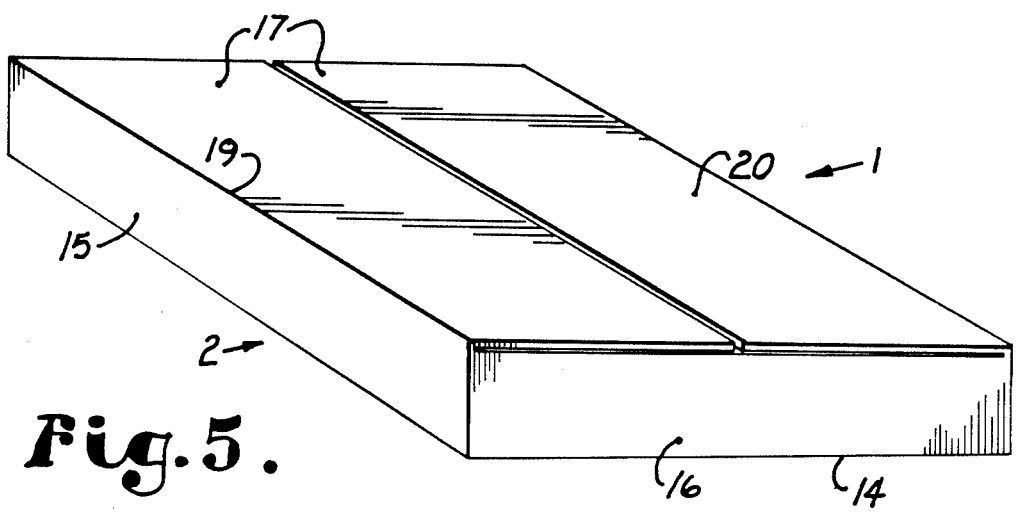
FIG. 5 is a perspective view similar to FIG. 1 and illustrates flaps of the container folded to enclose the litter box system according to the present invention.

The reference numeral 1 generally designates a self contained disposable system for animal litter box maintenance according to the present invention. Referring to FIGS. 1 and 2, the system 1 generally includes a container 2 having positioned therein a plurality of layers 3 of absorbent litter material 4 separated by associated layer separation sheets 5. Each of the sheets 5 has a pair of opposite wide borders 6 and narrow borders 7 to which is applied a releasable adhesive 8 to adhere the sheets 5 to the walls of the container 2. As each layer of litter 4 is used, the associated sheet 5 is separated from the container 2 to remove the entire layer 3 of litter 4 from the container for deposit. FIG. 5 shows the container 2 in a closed condition in which the system 1 is transported and handled, and FIG. 1 shows the container 2 in an open condition in which the system 1 is used as a litter box.

Referring particularly to FIG. 1, the container 2 is a flattened rectangular box formed from a material such as conventional cardboard. The container 2 includes a bottom wall, represented by reference numeral 14, with side walls 15 and end walls 16 projecting upwardly therefrom. Extending from the side walls 15 are side flaps 17 and from the end walls 16 are end flaps 18. The flaps 17 and 18 are folded down at the full level 19 of the container 2 to form a top 20 of the closed container 2. When the flaps 17 and 18 are opened, they are secured in an upright position by the use of adhesive strips or tape 21 to form an enclosure for the animal to use as a toilet. On one of the end flaps 18, there is a U-shaped perforated line 23 which allows for removal of an entry portion 24 of the flap 18 to facilitate entry and exit by the animal.

As shown in FIG. 1, the topmost sheet 5 of plastic film is installed in the container 2 in such a manner that the narrow borders 7 of the sheet 5 are attached to the end flaps 18 about one-half inch up from the full level 19 of the container 2. The wide borders 6 of the sheet 5 are attached well up the side flaps 17. It is these wide borders 6 which are used to handle the sheet 5 supporting the soiled absorbent 4 when it is removed from the container 2.

FIG. 2 shows the layers 3 of litter 4 separated by the sheets 5 of the system 1 outside the container 2. The layers 3 of litter 4 are attached to the inside of the container 2 by the sheets 5 and are supported by the container 2. In the illustrated system 1, there are six layers of absorbent 4 and five sheets 5 of plastic film. There could be any number of layers, but this amount allows for a litter box change every five days for a month which is adequate for an average cat. The system 1 could become too heavy for the container 2 if too many layers 3 were installed.

All the layers 3 are of the same depth, as shown by the bottom layer and cover the same surface area as the top layer. The width of the adhesive applications 8 is the same as the depth of the layers 3 of absorbent 4. Thus, if a one-half inch depth is used for the absorbent 8, then the width of the adhesive application 8 to each plastic sheet 5 will be a uniform one-half inch. This is because the plastic sheets 5 are all the same size, so that the depth of the absorbent layers 3 between two adjacent plastic sheets 5 causes the top sheet to rise the depth of the absorbent 4. The area thus exposed is the only area of the plastic sheet 5 that contacts the container 2. At the end walls 16 of the container 2, the narrow borders 7 of each plastic sheet 5 rise about an inch above the level of absorbent 4 in the associated layer 3. At the side walls 15, the wide borders 6 extend about four inches from the level of the absorbent. All four sides are attached to the container at the very top of these extensions.

FIG. 3 shows two layers 3 of absorbent 4 separated by one sheet 5 of plastic. In FIG. 3 the container 2 has been removed for illustrative purposes. The top layer of absorbent 4 is available for use by a pet. The borders 6 and 7 of the plastic sheet 5 are folded up to surround the absorbent 4, and corners 26 are folded in to protect against liquids leaking through to the next layer 3 of absorbent 4.

Figure 4:
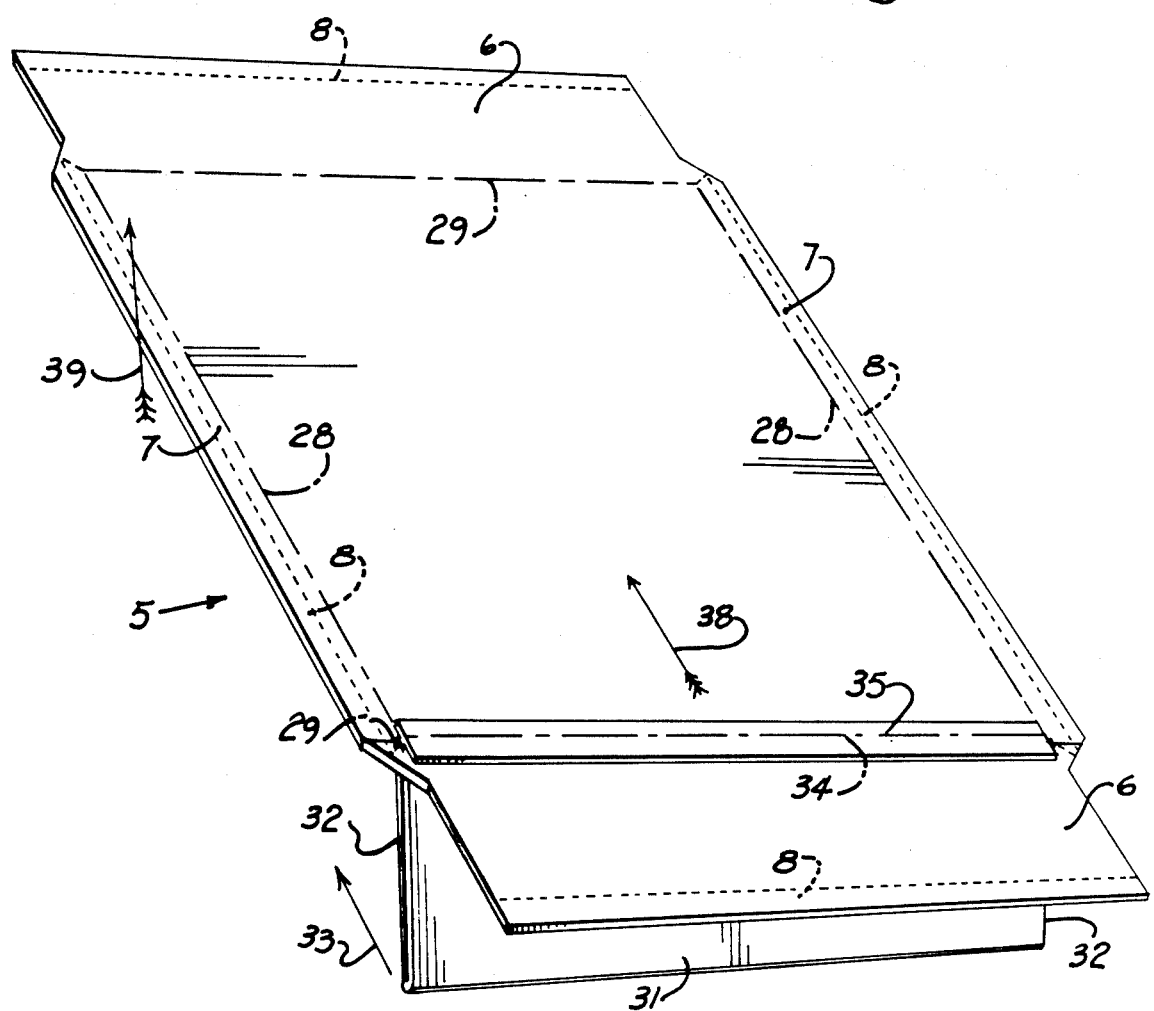
FIG. 4 is a perspective view of a layer separation sheet of the litter box system and illustrates the sheet in a flattened condition with a pouch depending therefrom.

FIG. 4 shows a plastic sheet 5 as manufactured and ready for installation in the container 2 of the system 1. The sheet 5 is constructed from polyethylene plastic with a thickness in the range of 0.004 to 0.005 inch. The wide borders 6 are folded along fold lines 28, and the narrow borders 7 are folded along fold lines 29 for installation in the container 2 between the layers 3 of litter 4.

A pouch 31 is formed by folding the sheet 5 and cutting and sealing it at the ends 32. The pouch 31 is folded up and in towards the center of the sheet 5 in the direction of arrow 33 in FIG. 4. A pouch opening 34 is protected by a guard strip 35 of plastic which may be made from the same material as the sheet 5 of plastic film and bonded to the sheet along a line 36 which is on the border side of the pouch opening 34. The guard strip 35 protects the pocket opening 34 because an animal can only pull down and towards the center of the container 2 in the direction of arrow 38 in FIG. 4. For an animal to access the opening 34, it must hold the guard strip 35 up with one limb and claw at the pouch opening 34 with another, an act which is unnatural for any quadruped. If the guard were not installed, the animal might be able to damage the pouch 31 and the adhesive bond.

The bonds of the adhesive 8 work against the animal and for the person because of the different ways each attacks this bond. The animal pulls from inside the container 2 towards the inside of the container in the direction of the arrow 38. In this manner, the force of the animal's pulling is dispersed along a large area of the bond and is resisted by the full strength of the bond. The force a person puts on the bond when removing the plastic sheet 5 is completely diferent from the animal's. A person pulls from inside the container 2 towards the outside in the direction of arrow 39 in FIG. 4, in an upward and outward direction. In this manner, only a small area of the bond is affected by the force of the pulling, so that the bond gives way and the plastic sheet 5 can be removed without damage to the container 2 or the plastic sheet 5. It is this fact that makes it difficult for the animal to damage the bond while allowing for easy removal of the plastic sheet 5 and one layer 3 of absorbent 4 by the person.

To remove a soiled top layer 3 of absorbent 4, a person grasps the wide border 6 opposite the hidden pouch 31 and pulls towards the pouch opening 34. As the plastic sheet 5 is pulled, the adhesive bond on both the narrow borders 7 releases, and the absorbent 4 falls towards the pouch opening 34. When the end of the adhesive bond is reached, the pocket or pouch 31 springs open from the pulling force, and the absorbent 4 and everything contained therein falls into the open pouch 31. Then the plastic sheet 5 may be pulled loose at the remaining bond and removed for deposit in a receptacle. At this time, the next lower layer 3 of absorbent 4 is available for use by an animal.

I claim:

1. A disposable animal litter box arrangement comprising:
   (a) a rectangular container having a bottom wall and opposite pairs of side walls and end walls upstanding from said bottom wall;
   (b) a plurality of layers of animal litter positioned in stacked relation within said container;
   (c) said layers of animal litter being separated by sheets, each sheet having border portions which are folded upwardly to contain an associated layer of said litter therein; and
   (d) said border portions of said sheets having releasable adhesive thereon to releasably adhere said border portions of said sheets to said side walls and end walls of said container such that, as each layer of litter becomes used, the border portions of the associated sheet may be released from said walls to remove the used layer of litter from said container for disposal.

2. An arrangement as set forth in claim 1 wherein each sheet is substantially rectangular with opposite sides and opposite ends, and each sheet includes:
   (a) a pair of relatively wide end border portions positioned at opposite ends of said sheet;
   (b) a pair of relatively narrow side border portions positioned at opposite sides of said sheet; and
   (c) said sheet being positioned within said container with said end border portions adhered respectively to said end walls of said container and with said side border portions adhered respectively to said side walls of said container.

3. An arrangement as set forth in claim 1 wherein each sheet includes:
   (a) an integral pouch folded under said sheet when said sheet is positioned within said container, said pouch being opened upon the removal of said sheet from said container to receive and contain the used litter associated with said sheet for disposal thereof.

4. An arrangement as set forth in claim 3 wherein each sheet is substantially rectangular with opposite side and opposite ends and wherein:
   (a) said sheet is folded across one end thereof to form said pouch having a top opening, said pouch having side pouch edges which are bonded to close the side pouch edges; and
   (b) said opening is covered by a pouch closure strip which extends along and in covering relation to said opening and which is bonded to said sheet along one side of said opening.

5. An arrangement as set forth in claim 1 wherein said container includes:
   (a) opposite end flaps extending respectively from said end walls;
   (b) opposite side flaps extending respectively from said side walls;
   (c) said end flaps and side flaps being folded in covering relation to said layers of litter to close said container; and
   (d) said end flaps and side flaps being opened and folded in upstanding relation and attached to one another in such a manner as to increase the depth of said container for use of said arrangement.

6. An arrangement as set forth in claim 5 wherein:
   (a) one of said end flaps is perforated to form a removable cutout portion therein, said cutout portion being separated from said one of said end flaps to form an opening therethrough to facilitate the entry of an animal into said container.

7. A disposable animal litter box arrangement comprising:
   (a) a rectangular container having a bottom wall and opposite pairs of side walls and end walls upstanding from said bottom wall, said container further including:
      (1) opposite end flaps extending respectively from said end walls;
      (2) opposite side flaps extending respectively from said side walls;
      (3) said end flaps and side flaps being folded in covering relation to said layers of litter to close said container; and
      (4) said end flaps and side flaps being opened and folded in upstanding relation and attached to one another in such a manner as to increase the depth of said container for use of said arrangement;
   (b) a plurality of layers of animal litter positioned in stacked relation within said container;
   (c) said layers of animal litter being separated by sheets, each sheet having border portions which are folded upwardly to contain an associated layer of said litter therein;
   (d) an integral pouch folded under said sheet when said sheet is positioned within said container, said pouch being opened upon the removal of said sheet from said container to receive and contain the used litter associated with said sheet for disposal thereof; and
   (e) said border portions of said sheets having releasable adhesive thereon to releasably adhere said border portions of said sheets to said side walls and end walls of said container such that as each layer of litter becomes used, the border portions of the associated sheet may be released from said walls to remove the used layer of litter from said container for disposal.

8. An arrangement as set forth in claim 7 wherein each sheet is substantially rectangular with opposite sides and opposite ends, and each sheet includes:
   (a) a pair of relatively wide end border portions positioned at opposite ends of said sheet;
   (b) a pair of relatively narrow side border portions positioned at opposite sides of said sheet; and
   (c) said sheet being positioned within said container with said end border portions adhered respectively to said end walls of said container and with said side border portions adhered respectively to said side walls of said container.

9. An arrangement as set forth in claim 7 wherein each sheet is substantially rectangular with opposite side and opposite ends and wherein:
   (a) said sheet is folded across one end thereof to form said pouch having a top opening, said pouch having side pouch edges which are bonded to close the side pouch edges; and
   (b) said opening is covered by a pouch closure strip which extends along and in covering relation to said opening and which is bonded to said sheet along one side of said opening.

10. An arrangement as set forth in claim 7 wherein:
   (a) one of said end flaps is perforated to form a removable cutout portion therein, said cutout portion being separated from said one of said end flaps to form an opening therethrough to facilitate the entry of an animal into said container.

* * * * *